(12) United States Patent
Yamamoto et al.

(10) Patent No.: US 10,429,500 B2
(45) Date of Patent: Oct. 1, 2019

(54) TRACKING APPARATUS, TRACKING METHOD, AND COMPUTER-READABLE STORAGE MEDIUM

(71) Applicant: Oki Electric Industry Co., Ltd., Tokyo (JP)

(72) Inventors: Kohei Yamamoto, Tokyo (JP); Motoko Kagaya, Tokyo (JP); Kurato Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 350 days.

(21) Appl. No.: 15/447,091

(22) Filed: Mar. 1, 2017

(65) Prior Publication Data

US 2017/0254896 A1    Sep. 7, 2017

(30) Foreign Application Priority Data

Mar. 2, 2016   (JP) .................................. 2016-039639

(51) Int. Cl.
| | |
|---|---|
| *G06T 7/00* | (2017.01) |
| *G01S 13/86* | (2006.01) |
| *G01S 7/40* | (2006.01) |
| *G06T 7/20* | (2017.01) |

(52) U.S. Cl.
CPC ............. *G01S 13/867* (2013.01); *G01S 7/40* (2013.01); *G06T 7/001* (2013.01); *G06T 7/20* (2013.01); *G06T 7/97* (2017.01); *G06T 2207/10044* (2013.01); *G06T 2207/30168* (2013.01)

(58) Field of Classification Search
CPC ..................... G01S 13/867; G01S 7/40; G06T 2207/10044; G06T 2207/30168; G06T 7/001; G06T 7/20; G06T 7/97
USPC .......................................................... 342/55
See application file for complete search history.

(56) References Cited

U.S. PATENT DOCUMENTS

2015/0092990 A1*   4/2015   Ono .................... G06K 9/00791
                                                                382/104

FOREIGN PATENT DOCUMENTS

JP           2014-006123 A         1/2014

* cited by examiner

*Primary Examiner* — Timothy A Brainard
(74) *Attorney, Agent, or Firm* — Rabin & Berdo, P.C.

(57) ABSTRACT

A tracking apparatus, including (1) a first target object tracking unit having a first processor, configured to correct a first information of at least one first candidate target object, detected by an image sensor, according to a first predetermined motion model, and to determine a distribution of the first information, (2) a second target object tracking unit including a second processor, configured to correct a second information of at least one second candidate target object, detected by an active type sensor, according to a second predetermined motion model, and to determine a distribution of the second information, (3) a matching unit configured to obtain a plurality of distribution parameters based on a correlation of the distributions of the first and second information, and (4) a false image determining unit configured to determine whether or not the second information corresponds to a false image based on the plurality of distribution parameters.

12 Claims, 4 Drawing Sheets

TRACKING APPARATUS, TRACKING METHOD, AND COMPUTER-READABLE STORAGE MEDIUM

TECHNICAL FIELD

The present invention relates to a tracking apparatus, a tracking method, and a computer-readable storage medium.

BACKGROUND ART

According to Japanese Patent Application Laid-Open (JP-A) No. 2014-006123, by combining a radar and an image sensor, candidates for a target object included in radar data and image sensor data can be evaluated to determine whether or not they are for a same target object. Information of the target object, such as a position and an orientation of the target object, can be estimated when the candidates are for the same target object. Japanese Patent Application Laid-Open (JP-A) No. 2014-006123 discloses a technique of determining whether a reaction of the radar exists in a lateral direction of a threshold from a position of a target object obtained from the image sensor data. The determination may also be based on a comparison of the orientation (and a comparison of the relative speed). Japanese Patent Application Laid-Open (JP-A) No. 2014-006123 also discloses the estimation of the target object information, through a technique of selecting one of the target object information of the radar data and that of the image sensor data, and a technique of integrating different target object information by a weighted sum.

SUMMARY OF THE INVENTION

However, if power of the detected signal in a false image is large, or if the false image is close to the lateral position of the target object, artifacts may exist in the radar data due to the influence of multiple reflections of the radar, a problem that may cause erroneous determination or erroneous estimation. The present invention provides a technique to improve the determination accuracy of the false image.

The invention relates to a tracking apparatus, which includes (1) a first target object tracking unit including a first processor, which is configured to correct a first information of at least one first candidate target object, detected by an image sensor, according to a predetermined motion model, and to determine a first distribution that is a distribution of the first information; (2) a second target object tracking unit including a second processor, which is configured to correct a second information of at least one second candidate target object, detected by an active type sensor by measuring a reflected wave, according to the predetermined motion model, and to determine a second distribution that is a distribution of the second information; (3) a matching unit configured to obtain a plurality of distribution parameters from the first distribution and the second distribution based on a correlation therebetween; and (4) a false image determining unit configured to determine whether or not the second information corresponds to a false image based on the plurality of distribution parameters. Each of the first information and the second information includes at least one of a relative speed and a distance, and both the at least one first candidate target object and the at least one second candidate target object are obtained by detecting at least one target object existing in a predetermined space.

The invention also relates to a tracking method, which includes (1) correcting a first information of at least one first candidate target object, detected by an image sensor, according to a predetermined motion model, and determining a first distribution that is a distribution of the first information; (2) correcting a second information of at least one second candidate target object, detected by an active type sensor by measuring a reflected wave, according to the predetermined motion model, and determining a second distribution that is a distribution of the second information; (3) obtaining a plurality of distribution parameters from the first distribution and the second distribution based on a correlation therebetween; and (4) determining whether or not the second information corresponds to a false image based on the plurality of distribution parameters. Each of the first information and the second information includes at least one of a relative speed and a distance. Both the at least one first candidate target object and the at least one second candidate target object are obtained by detecting at least one target object existing in a predetermined space.

The invention also relates to a computer-readable storage medium storing computer-executable program instructions, execution of which by a computer causes the computer to track an object. The program instructions include (1) instructions to correct a first information of at least one first candidate target object, detected by an image sensor, according to a predetermined motion model, and to determine a first distribution that is a distribution of the first information; (2) instructions to correct a second information of at least one second candidate target object, detected by an active type sensor by measuring a reflected wave, according to the predetermined motion model, and to determine a second distribution that is a distribution of the second information; (3) instructions to obtain a plurality of distribution parameters from the first distribution and the second distribution based on a correlation therebetween; and (4) instructions to determine whether or not the second information corresponds to a false image based on the plurality of distribution parameters. Each of the first information and the second information includes at least one of a relative speed and a distance. Both the at least one first candidate target object and the at least one second candidate target object are obtained by detecting at least one target object existing in a predetermined space.

DESCRIPTION OF THE EMBODIMENTS

Figure 1:
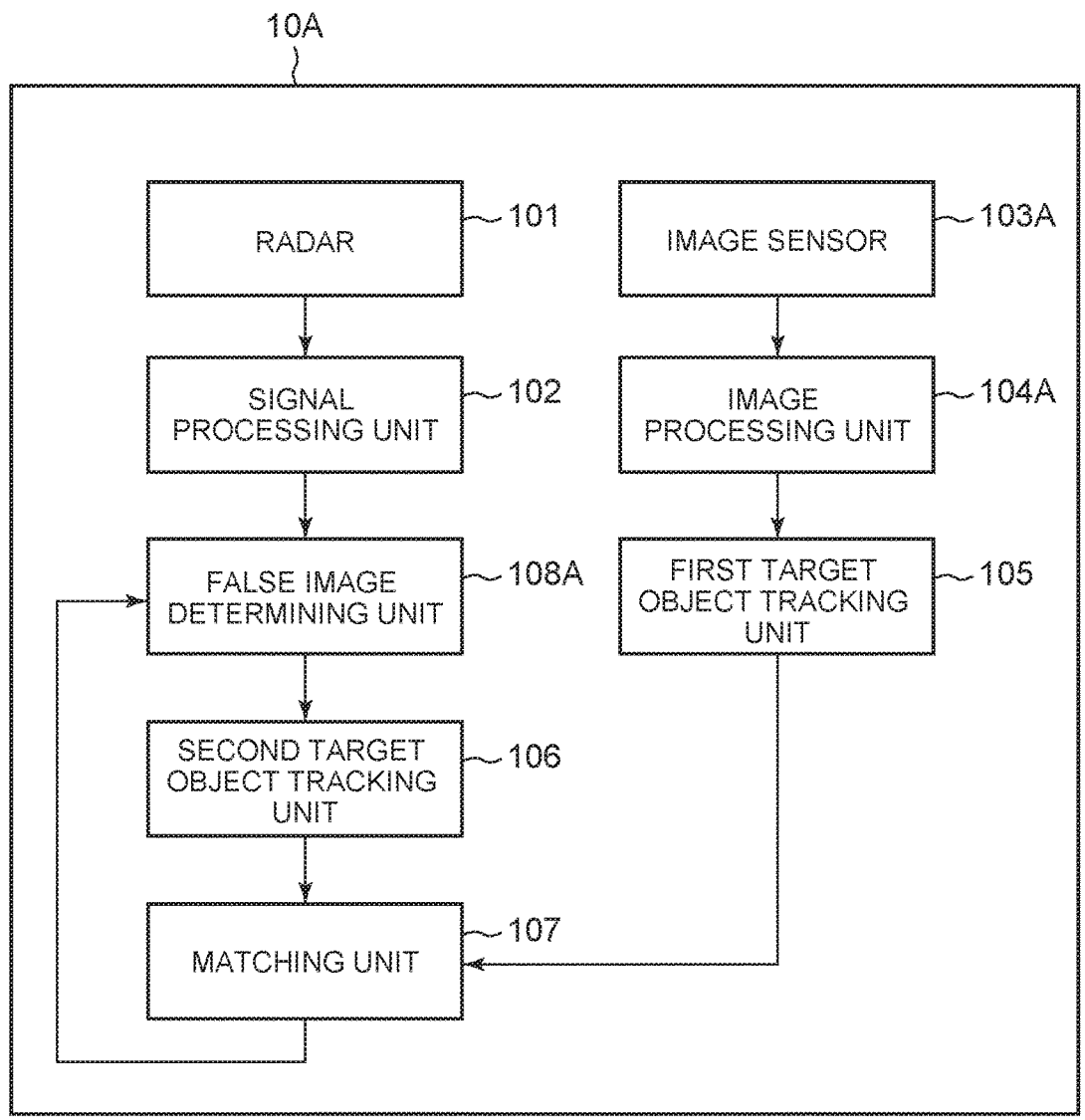
FIG. 1 illustrates the configuration of a tracking apparatus according to a first embodiment of the invention.

The embodiments of the present invention will be described in detail with reference to the accompanying drawings. In the specification and drawings, components having substantially the same functions and configurations will be referred to using the same or similar reference numerals, and duplicated description thereof will be omitted.

Particularly, in the specification and drawings, a plurality of components having substantially the same function and structure are denoted by different numbers attached to the same reference numeral. Similar components in different embodiments may be differently denoted by a different alphabetical letter attached to the same reference numeral. However, when there is no substantial need to distinguish between a plurality of components such as those having the same function and structure, those components are denoted by the same reference numeral only.

(1) First Embodiment (a) Description of Configuration

FIG. 1 illustrates the configuration of a tracking apparatus according to the first embodiment. As shown in FIG. 1, the tracking apparatus 10A may include a radar 101, a signal processing unit 102, an image sensor 103A, an image processing unit 104A, a first target object tracking unit 105, a second target object tracking unit 106, a matching unit 107 and a false image determining unit 108A.

The radar 101 transmits radio waves of a millimeter wave to a target object. The radar 101 is a continuous-wave (CW) type radar that can receive reflected waves, has a plurality of receiving elements, and has a function of transmitting signals by switching between different oscillation frequencies discretely at different stages. The radar 101 may also transmit signals by switching between different oscillation frequencies continuously, in which case formulas different from those shown below may be used.

The signal processing unit 102 analyzes a received signal, and calculates the relative velocity, and the distance and angle of the target object.

The image sensor 103A is a sensor capable of continuously capturing images.

The image processing unit 104A detects the target object and the position of the target object from an image detected by the image sensor 103A, and corrects the position of the target object using the radar coordinate system.

The first target object tracking unit 105 tracks and corrects the position of the target object detected by the image processing unit 104A in accordance with a motion model.

The second the target object tracking unit 106 tracks and corrects the position of the target object detected by the signal processing unit 102 in accordance with the motion model. A different motion model may also be used.

The matching unit 107 obtains the correlation between a posterior probability distribution, which is the probability distribution of a state estimation value, which indicates a position of the target object, output by the first the target object tracking unit 105, and a prior probability distribution, which is the probability distribution of a state prediction value, which is a predictive value of the position of the target object, output by the second target object tracking unit 106.

The false image determining unit 108A determines whether a target object candidate inputted from the signal processing unit 102 is a false image or not in accordance with the output distribution of the matching unit 107 obtained for each the target object.

Each of the radar 101 and the image sensor 103A may be provided inside or outside the tracking apparatus 10A.

(b) The Description of the Operation

First, the radar 101 receives a signal, and inputs the received signal to the signal processing unit 102. The signal processing unit 102 analyzes the received signal, to calculate the relative velocity of a target object v [m/s], the distance r [m] and the angle of the target object $\phi$ [rad] using a known method. For example, the signal processing unit 102 may first obtain the Doppler frequency $f_d$ [Hz] using a Fast Fourier Transform (FFT), and then obtain the relative speed v using $v=(\lambda/2)*f_d$, by using a wavelength of the transmitted wave $\lambda$ [m].

Further, for example, the signal processing section 102 may obtain the distance r by $$r = \frac{c\Delta\phi_s}{4\pi\Delta f_s}$$

using a difference between the oscillation frequencies $\Delta f_s$ [Hz] of the radio waves of the radar 101, and a signal phase difference between the oscillation frequencies $\Delta\phi_s$ [rad]. c [m/s] is the velocity of light.

The signal processing unit 102 may also obtain the angle $\phi$ by $$\phi = \sin^{-1}\left(\frac{\lambda\Delta\phi_r}{2\pi L}\right)$$

using the signal phase difference $\Delta\phi_r$ between the receiving elements having the same Doppler frequency. Here, L [m] is the spacing of the elements of the receiving antenna.

In the method above, the Doppler frequency corresponds one-to-one to the target object to be detected. In other words, every Doppler frequency, relative speed, distance and angle can be obtained in one set. However, a normal reception signal includes many noise components. Therefore, in order to select a representative Doppler frequency from the received signal, the noise must be processed properly. The signal processing unit 102 includes a constant false alarm rate (CFAR) circuit that determines a threshold for dynamically determining signal strength against noise, to select a representative value of the Doppler frequency. The signal processing unit 102 outputs a relative speed, a distance and an angle, corresponding to the Doppler frequency that exceeds the threshold value of the CFAR circuit, which are then input to the matching unit 107.

Here, if a reflective object exists at a position close to the target object, multiple reflections may occur. When the antenna of the radar 101 receives multiple reflection waves, the constant signal strength from a direction in which the target object is not present and the observation value with a Doppler frequency is obtained. Because it may exceed the threshold of the CFAR circuit, the multiple reflection waves may create a false image. When multiple observation values are obtained, it is necessary to determine which observation value includes desired target object information.

The image sensor 103A is a sensor capable of continuously capturing images. The image sensor 103A inputs an output image to the image processing unit 104A.

The image processing unit 104A measures in advance the positional relationship between the image sensor 103A and the radar 101. Thereby, the image processing unit 104A performs correction so that the output coordinate system of the image sensor 103A is equivalent to that of the radar 101. Then, the image processing unit 104A identifies the position of the target object by a known method such as background subtraction and template matching. The image processing unit 104A calculates a distance and an angle of the target object relative to the position of the radar 101 from the position of the identified target object, and inputs together with a number of the detected target object, detected in the first target object tracking unit 105

The first target object tracking unit 105 is able to track the relative speed, distance and angle of the target object by using a Kalman filter, a particle filter or the like. For example, for the relative speed $v_k$ of time k, and the distance $r_k$ and angle $\phi_k$ to be represented by a vector $\theta_k = [v_k \ r_k \ \phi_k]^T$, a state space model in the case of using an extended Kalman filter (EKF) can be written as $$\theta_{k+1} = f(\theta_k) + \varepsilon_k \quad \varepsilon_k \sim N(0, \Sigma_{sys})$$

and $$\theta_{obs} = \theta_k + \xi_k \quad \xi_k \sim N(0, \Sigma_{obs})$$

where $\theta_{obs}$ is an observation value, $\Sigma_{sys}$ is the covariance matrix of the system noise, and $\Sigma_{obs}$ is the covariance matrix of the observation noise.

Figure 3:
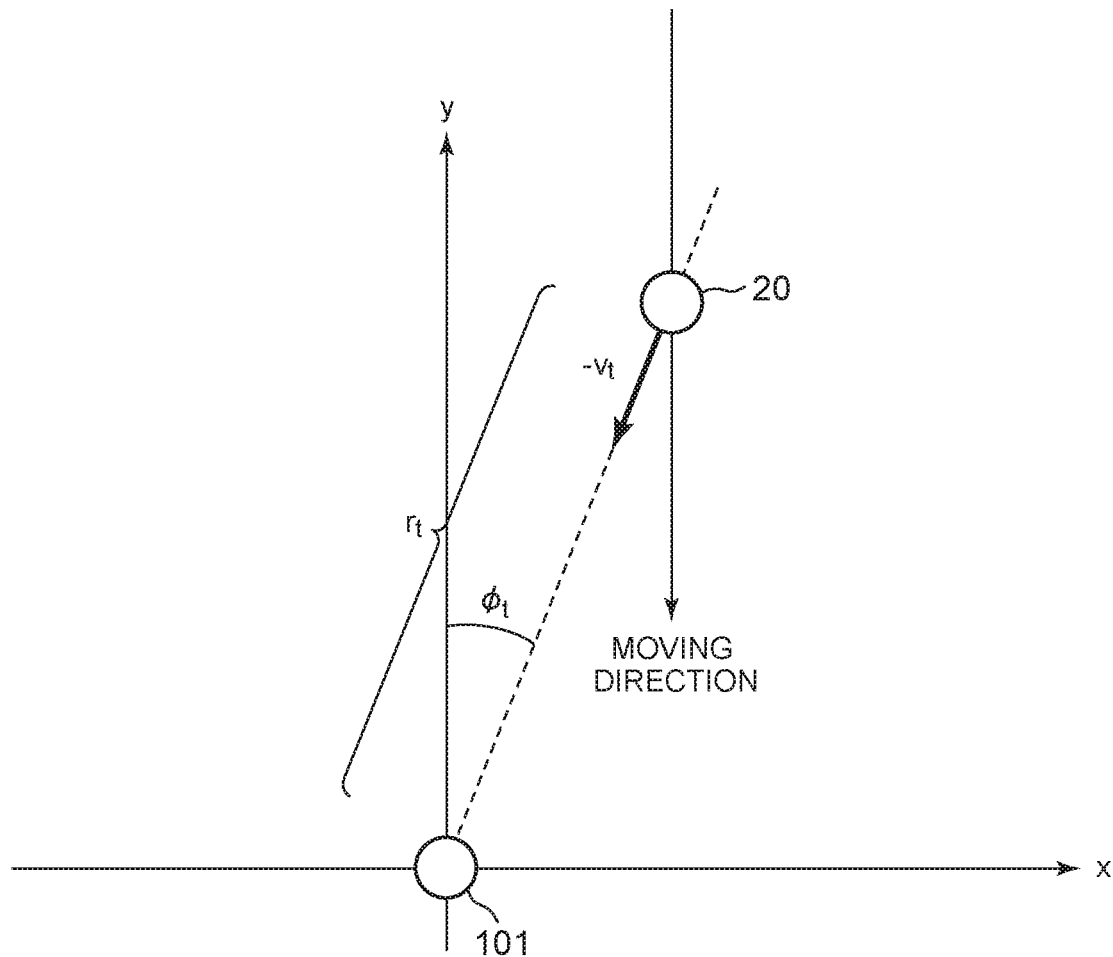
FIG. 3 illustrates an example of a motion model of the target object.

FIG. 3 illustrates an example of a motion model of the target object. As shown in FIG. 3, the target object 20 performs a linear uniform motion. Assuming that the movement amount in the horizontal direction with respect to the radar 101 (X-axis direction in FIG. 3) is zero, the motion model can be expressed as $$f(\theta_k) = \begin{bmatrix} v_k \\ r_k + v_k \\ \phi_k + \dfrac{v_k}{r_k} \tan \phi_k \end{bmatrix} (-\pi/2 < \phi_k < \pi/2)$$

To track the target object by the above method, the first target tracking unit 105 inputs a state estimation value $\hat{\theta}_c$ for the target object c tracked in the image sensor 103A and post-covariance matrix $\hat{\Sigma}_c$ to the matching unit 107.

The second target object tracking unit 106 incorporates an observation value that is determined not to be the false image by the false image determining unit 108A. Then, the second target object tracking unit 106 performs the same operation as the first target tracking unit 105, and outputs the state estimation value as the tracking result. In addition, for subsequent false image determination, the second target tracking unit 106 inputs the state prediction value $\theta_i$ for the target object i tracked in the radar 101 and pre-covariance matrix $\Sigma_i$ to the matching unit 107.

The matching unit 107 treats the values input from the first target object tracking unit 105 as a posterior distribution, and treats the values input from the second target tracking unit 106 as a predictive distribution. For example, in case of using the Gaussian for the posterior or the predictive distribution, these values are means (averages) and variances. Each distribution can be represented using these two parameters only. Then, the matching unit 107 obtains an overlapping degree $S_{c,i}$ between the predictive distribution $\theta \sim N(\theta_i, \Sigma_i)$ and the posterior distribution $\theta \sim N(\hat{\theta}_c, \hat{\Sigma}_c)$. Here, $N(\mu, \Sigma)$ denotes the Gaussian distribution represented by the average $\mu$ and variance $\Sigma$.

The overlapping degree $S_{c,i}$ is an index of the correlation between the distribution which is obtained by $$S_{c,i} = \int a_{c,i} N(\mu_{c,i}, \Sigma_{c,i}) d\theta = a_{c,i}$$

This equation is obtained as follows:

$$N(\hat{\theta}_c, \hat{\Sigma}_c) \cdot N(\theta_i, \Sigma_i) = a_{c,i} N(\mu_{c,i}, \Sigma_{c,i})$$

$$a_{c,i} = \dfrac{1}{\sqrt{(2\pi)^3 |\hat{\Sigma}_c + \Sigma_i|}} \exp\left(-\dfrac{1}{2}(\hat{\theta}_c - \theta_i)^T (\hat{\Sigma}_c + \Sigma_i)^{-1} (\hat{\theta}_c - \theta_i)\right)$$

$$\mu_{c,i} = (\hat{\Sigma}_c^{-1} + \Sigma_i^{-1})^{-1} (\hat{\Sigma}_c^{-1} \hat{\theta}_c + \Sigma_i^{-1} \theta_i)$$

$$\Sigma_{c,i} = (\hat{\Sigma}_c^{-1} + \Sigma_i^{-1})^{-1}$$

$$S_{c,i} = \int a_{c,i} N(\mu_{c,j}, \Sigma_{c,j}) d\theta = a_{c,j}$$

Figure 2:
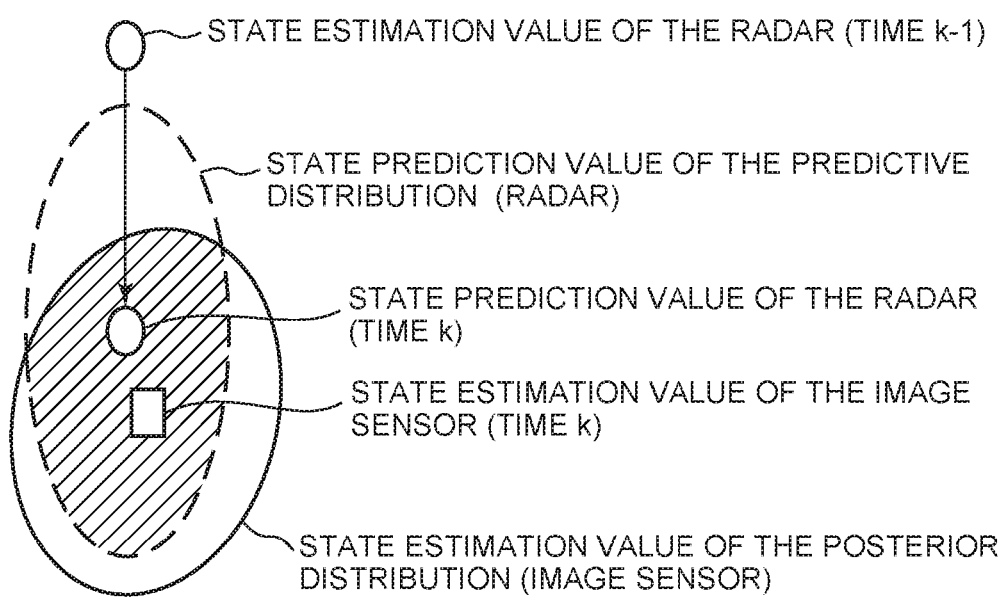
FIG. 2 illustrates an example of the overlapping degree between distributions.

As shown in FIG. 2, the degree of overlapping $S_{c,i}$ may be viewed as a weighted area of the region to be shared by the distributions (the shaded portion in FIG. 2). Here, the weight of each distribution is the magnitude of the variance of the distribution.

Then, the matching unit 107 selects a case in which the sum of the overlapping degree $S_{c,i}$ becomes the maximum from among the number of the factorials of the target object number (i.e., among all possible values of $S_{c,i}$), matched as the same of the tracking target in the radar 101 and the image sensor 103. The matching unit 107 inputs distribution parameter combinations that are matched, $\mu_{c,i}$ and $\Sigma_{c,i}$, in the false image determining unit 108A.

The false image determining unit 108A determines whether or not the observation value corresponding to the Doppler frequency exceeding the threshold value $\theta$ of the CFAR circuit, which is inputted from the signal processing unit 102 (the relative speed, distance and angle), is a false image. In the determination, if $d_{c,i} \leq \chi^2(\alpha)$ is satisfied, the false image determining unit 108A determines that the observation value is not the false image. Here, $d_{c,i}$ is the Mahalanobis distance of the square value, $d_{c,i} = (\theta - \mu_{c,i})^T \Sigma_{c,i}^{-1} (\theta - \mu_{c,i})$, assuming that $d_{c,i}$ follows the distribution of the three degrees of freedom $\chi^2(\alpha)$ with a probability of any rejection $\alpha$. $\alpha$ is a degree of freedom with respect to the $\chi^2$ distribution. If, on the other hand, $d_{c,i} > \chi^2(\alpha)$ is satisfied, the false image determining unit 108A determines that the observation value is the false image.

If the false image determining unit 108A determines that a single observation value is not the false image, the false image determining unit 108A inputs the observation value to the second target object tracking unit 106. Further, if the false image determining unit 108A determines that two or more observation values are not false images, the false image determining unit 108A inputs the observation values of which the Mahalanobis distance is a minimum to the second target object tracking unit 106. Alternatively, if the false image determining unit 108A determines that two or more observation values are not false images, the second target object tracking unit 106 may be skipped.

By the above operations, the tracking of the target object is achieved. The value that is finally output is the state estimation value obtained from the second target object tracking unit 106.

(c) Description of the Effect

The above-described motion model $f(\theta_k)$ can be used for the first target object tracking unit 105 and the second target object tracking unit 106. The target object is in linear uniform motion in the motion model $f(\theta_k)$ described above. Therefore, if there is no horizontal movement relative to the radar 101, it is possible to predict the parameters of the next time with high accuracy.

By using these parameters, the matching unit 107 and the false image determining unit 108A take into account the nature and accuracy of the results obtained by the image sensor 103A. In general, the relative speed acquired by the image sensor 103A is not as accurate as the relative velocity obtained by the radar 101. The reason is because the relative speed of the image sensor 103A is calculated on the basis of the time derivative approximation of the position of the target object. Furthermore, when using the image sensor 103A, as the distance becomes large, the measurement accuracy thereof deteriorates. However, when using the image sensor 103A, the number of the target objects can be accurately detected even though the distance is large. Further, since the false image such as those generated by the radar 101 is not generated, it is possible to track the target object with stability. Stability here refers to the nature in which the image sensor detects the number of the objects more accurately than the radar sensor.

The signal processing unit 102 and the image processing unit 104A have taken up its stability in matching method and the false image determination method in the radar 101. By the product of the predictive distribution of the state prediction value of the radar 101 and the posterior distribution of the state estimation value of the image sensor 103A, the stability with the image sensor 103A can be incorporated into the state prediction of the radar 101. As a result, it is possible to "get the appearance distribution of the observation value," and "degree of correlation of the acquisition between the distributions".

Performance of the matching based on the degree of correlation between the distributions is better than when determining the distance between the estimation value of the image sensor 103A and the prediction value of the radar 101. That is, using the correlation between position distributions is more beneficial than using the correlation between position values. Therefore, the matching accuracy can be improved. Appearance distribution of the observation value takes into account both the nature of the image sensor 103A has the properties possessed (not the nature in which a false image is generated) and the radar 101 has the properties possessed (high precision). Therefore, it can be expected an effect of improving the artifact determination accuracy.

In the above, the false image determination unit 108A in the first embodiment uses the distribution concerning the product of the prediction distribution of the radar 101 and the posterior distribution of the image sensor 103A. However, if you want to consider either the posterior distribution or prediction distribution, using the additive of the Gaussian, it may calculate (Equation 35) by using the Gaussian distribution obtained by adding one of the distribution to the distribution of the product.

(2) Second Embodiment

Figure 4:
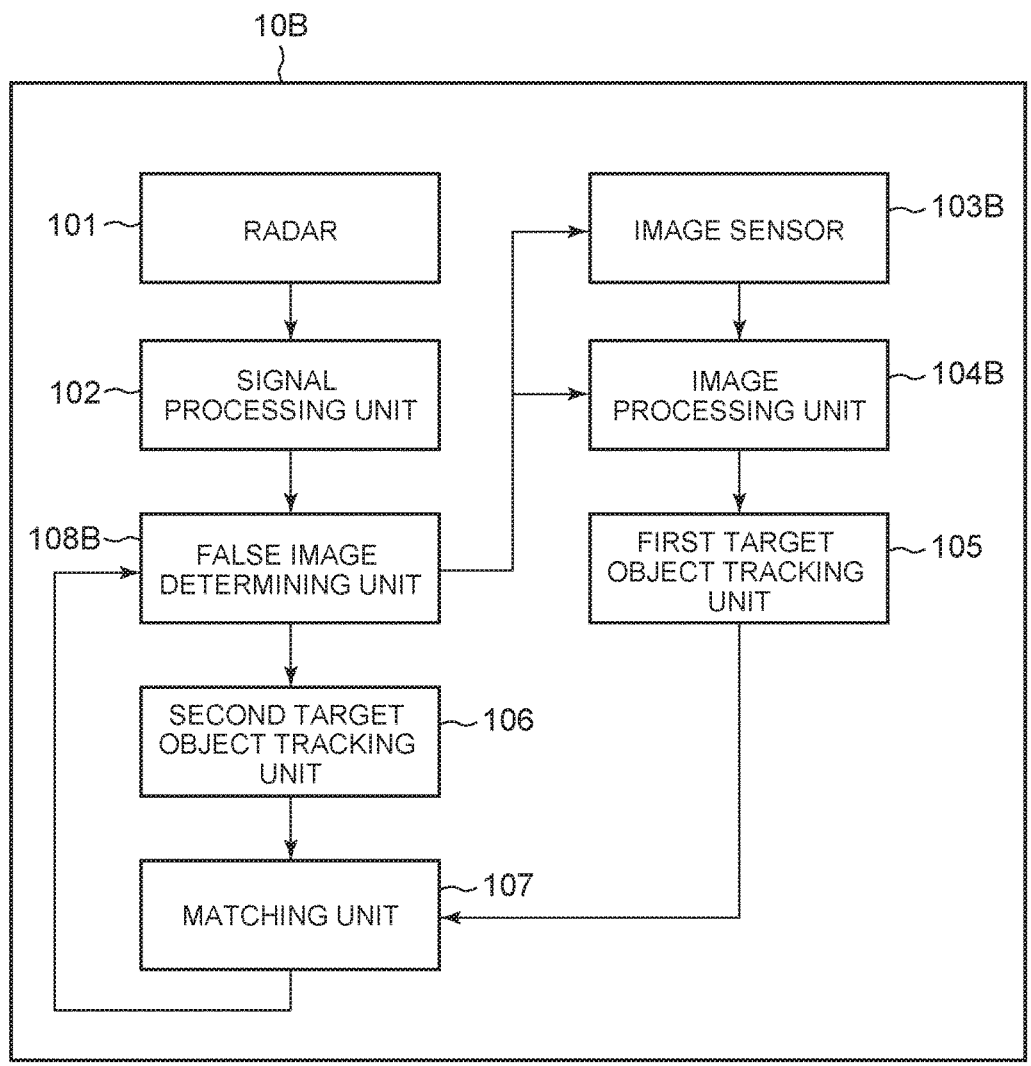
FIG. 4 illustrates the configuration of a tracking apparatus according to a second embodiment of the invention.

FIG. 4 illustrates the configuration of a tracking apparatus according to a second embodiment of the invention. As shown in FIG. 4, a tracking apparatus 10B according to the second embodiment includes the radar 101, the signal processing unit 102, an image sensor 103B, an image processing unit 104B, the first target object tracking unit 105, the second target object tracking unit 106, the matching unit 107 and a false image determining unit 108B. Hereinafter, different from the first embodiment, the image sensor 103B, the image processing unit 104B and the fake image determining unit 108B will be mainly described.

Images captured by the image sensor 103B are different depending on the situations. For example, when the vehicle is detected as the target object, in situations such as at dusk, the detection of edges for extracting the vehicle shape is deteriorated because of the Signal Noise Ratio (SNR) of the obtained image is deteriorated due to the reduction of the amount of sunlight and reduction of the contrast. Also, at the time of dusk, a vehicle may not have a light. Therefore, in the nighttime vehicle detection that uses light, the vehicle may appear dark in the image. Also, at the time of dusk, the surroundings may begin to become dark. Thus, the edges of the vehicle may be difficult to detect from the image.

Therefore, in the first embodiment, the observation values detected by the radar 101 is determined if information is derived from a target other than a target detected by the false image determining unit 108B. The results indicate a frequency of determining the "false image" by the unit 108B. Then, based on the results of the determination, the image processing image processing unit 104B is performed to dynamically change the processing parameters. Then, the image processing unit 104B outputs the image after the image processing by the changed processing parameters to the first target object tracking unit 105. The first target object tracking unit 105 tracks the target object again based on the image after the image processing by the changed processing parameters. Thus, the detection accuracy of the radar 101 is further improved.

In some situations, the false image determining unit 108B does not determine that the observation value detected by the radar 101 is information originating from other than the target. That is, the observation value detected by the radar 101 to be information derived from other than the target is not input from the false image determining unit 108B to the first image processing unit. In that case, the image processing unit 104B performs the first image processing on the observation value. Then, the image processing unit 104B outputs the observation value after the first image processing to the first target tracking unit 105.

On the other hand, the false image determining unit 108B may determine that the observation value detected by the radar 101 is information originating from other than the target. That is, the observation value detected by the radar 101 to be information derived from other than the target is input from the false image determining unit 108B to the first image processing unit. In that case, the image processing unit 104B performs second image processing on the observation value using processing parameters different from those of the first image processing. Then, the image processing unit 104B outputs the observation value after the second image processing to the first target tracking unit 105.

The processing parameters are not particularly limited. For example, one of the processing parameters may be the resolution of the image output from the image processing unit 104B. Another processing parameter may be luminance of the image, or contrast of the image. Yet another processing parameter may be the frame rate of the image output from the image processing unit 104B. In the case where pixels exceeding the threshold for the luminance of the image are extracted as the edge of the target, a processing parameter may be a threshold for edge extraction. That is, the processing parameters may include at least one of "resolution of image", "luminance of image", "frame rate of image", and "threshold value for edge extraction".

For example, when the processing parameter is the resolution of the image, the edge may be more easily detected from the image by increasing the resolution of the image. When the processing parameter is the luminance of the image, the edge may be more easily detected from the image by increasing the luminance of the image. When the processing parameter is the frame rate of the image, the edge may be more easily detected from the image by increasing the frame rate of the image. When the processing parameter is a threshold for edge extraction, edge may be more easily detected from the image by lowering the threshold for edge detection.

There are no particular limitations on the specific values of the processing parameters. For example, the processing parameters are selected for each condition. Then, depending on the condition to be satisfied, the processing parameters corresponding to the condition may be used. For example, "processing parameters for daytime" and "processing parameters for nighttime" are selected. Then, for a daytime time zone, "processing parameter for daytime" may be used; and for a night time zone, "processing parameter for nighttime" may be used.

The false image determining unit 108B may make a determination based on the observation value after the first image processing. If so, when the observation value detected by the radar 101 is determined to be information derived from other than the target, the false image determining unit 108B informs the image processing unit 104B that the observation value is derived from other than the target. On the other hand, the false image determining unit 108B may make a determination based on the observation value after the second image processing. In this case, when the observation value detected by the radar 101 is determined to be information derived from other than the target, the false image determining unit 108 determines that the observation value is the false image.

Further, in the first embodiment, when the difference between "the detection rate by the radar 101" and "the detection rate by the image sensor 103B" exceeds the threshold value, it is assumed that the detection accuracy of the image sensor 103B is reduced. Therefore, when the difference between "the detection rate by the radar 101" and "the detection rate by the image sensor 103B" exceeds the threshold value, the false image determining unit 108B changes the parameters of the image sensor 103B. Then, the image sensor 103 captures images using the changed parameters. As a result, it is expected that the detection accuracy by the radar 101 is further improved.

The parameters of the image sensor 103B are not particularly limited. For example, a parameter of the image sensor 103B may be the white balance of the image sensor 103B. Further, another parameter of the image sensor 103B may be the aperture of the image sensor 103B. That is, the parameters of the image sensor 103B may include at least one of "white balance of the image sensor 103B" and "aperture of the image sensor 103B".

For example, when the parameter of the image sensor 103B is the white balance, the edge may be easily detected from the image by adjusting the white balance. When the parameter of the image sensor 103B is the aperture, the edge may be easily detected from the image by enlarging the aperture.

(3) Description of Modification

While exemplary embodiments of the invention have been specifically described above by referring to the accompanying drawings, it should be understood that these are merely exemplary embodiments of the invention and are not to be considered as limiting. It is apparent for the person skilled in the art to which the invention belongs that various modifications or corrections may be made without departing from the gist of the claims, and it is understood that these modifications or corrections are, of course, included in the technical scope of the invention.

For example, in the present embodiment, the radar 101 has been described as a radar that radiates radio waves, but the radar 101 may be a radar that radiates sound waves. In such a case, a procedure such as changing the light speed to the sound speed is required. Further, in the present embodiment, the radar 101 is not limited, and any active type sensor that measures with a reflected wave is applicable.

In the above description, the example using a parameter of polar coordinates as the state space model has been described. However, in the present embodiment, it is also possible to use a state space model in which the relative speed, distance and angle are converted to orthogonal coordinates and the tracking is performed on the orthogonal coordinates, in addition to a model using parameters on the polar coordinates.

In the above description, the product of the posterior distribution of the image sensor 103 and the predictive distribution of the radar 101 is used, a predictive distribution of the image sensor 103 can be used instead of the posterior distribution of the image sensor 103.

Further, each component (excluding the radar 101 and the image sensor 103) constituting the tracking apparatus 10 is composed of a CPU (Central Processing Unit), a RAM (Random Access Memory) and the like. Program instructions are loaded to the RAM and executed by the CPU, thereby realizing the functions of each component. A recording medium on which the program instructions are recorded and which can be read by a computer can also be provided. Alternatively, each component constituting the tracking apparatus 10 may be constituted by dedicated hardware. Further, each component may be constituted by a combination of a plurality of pieces of hardware.

The invention claimed is:

1. A tracking apparatus, comprising:
   a first target object tracking unit including a first processor, which is configured
      to correct a first information of at least one first candidate target object, detected by an image sensor, according to a first predetermined motion model, and
      to determine a first distribution that is a distribution of the first information;
   a second target object tracking unit including a second processor, which is configured
      to correct a second information of at least one second candidate target object, detected by an active type sensor by measuring a reflected wave, according to a second predetermined motion model, and
      to determine a second distribution that is a distribution of the second information;
   a matching unit configured to obtain a plurality of distribution parameters from the first distribution and the second distribution based on a correlation therebetween; and
   a false image determining unit configured to determine whether or not the second information corresponds to a false image based on the plurality of distribution parameters, wherein
   each of the first information and the second information includes at least one of a relative speed and a distance, and
   both the at least one first candidate target object and the at least one second candidate target object are obtained by detecting at least one target object existing in a predetermined space.

2. The tracking apparatus according to claim 1, wherein the matching unit obtains the plurality of distribution parameters based on a third distribution, which corresponds to a product of the first distribution and the second distribution.

3. The tracking apparatus according to claim 2, wherein the first distribution, the second distribution, and the third distribution are all Gaussian distributions.

4. The tracking apparatus according to claim 2, wherein the false image determining unit determines whether or not the second information is the false image based on a Mahalanobis distance obtained using an exponent part of the third distribution.

5. The tracking apparatus according to claim 1, further comprising:
an image processing unit that is configured
to perform a first image processing on the first information, responsive to non-receipt of a signal indicating that the second information is information derived from other than the at least one target object, and to output the first information, after performing the first image processing, to the first target object tracking unit,
to perform a second image processing on the first information using a processing parameter different from that for the first image processing, responsive to receipt of the signal indicating that the second information is information derived from other than the at least one target object, and to output the first information, after performing the second image processing, to the first target object tracking unit, wherein
the false image determining unit is configured
to send, to the image processing unit, the signal indicating that the second information is derived from other than the at least one target object, upon determining that the second information is derived from other than the at least one target object based on the first information after performing the first image processing, and
to determine that the second information corresponds to the false image upon determining that the second information is derived from other than the at least one target object based on the second information after performing the second image processing.

6. The tracking apparatus according to claim 5, wherein the processing parameter includes at least one of a resolution of an image, luminance of the image, a frame rate, and a threshold value for edge extraction.

7. The tracking apparatus according to claim 1, wherein the false image determining unit changes a parameter of the image sensor when a difference between a detection ratio by the active type sensor and a detection ratio by the image sensor exceeds a predetermined threshold.

8. The tracking apparatus according to claim 7, wherein the parameter of the image sensor includes at least one of a white balance and an aperture.

9. The tracking apparatus according to claim 1, wherein the false image determining unit is configured to
output the second information to the second target object tracking unit upon determining that the second information does not correspond to the false image, and
output the first information detected by the image sensor to the second target object tracking unit upon determining that the second information corresponds to the false image.

10. The tracking apparatus according to claim 1, wherein the first distribution is a predicted distribution or a posterior distribution of the first information, and the second distribution is a predicted distribution of the second information.

11. A tracking method, comprising:
correcting a first information of at least one first candidate target object, detected by an image sensor, according to a first predetermined motion model, and determining a first distribution that is a distribution of the first information;
correcting a second information of at least one second candidate target object, detected by an active type sensor by measuring a reflected wave, according to a second predetermined motion model, and determining a second distribution that is a distribution of the second information;
obtaining a plurality of distribution parameters from the first distribution and the second distribution based on a correlation therebetween; and
determining whether or not the second information corresponds to a false image based on the plurality of distribution parameters, wherein
each of the first information and the second information includes at least one of a relative speed and a distance, and
both the at least one first candidate target object and the at least one second candidate target object are obtained by detecting at least one target object existing in a predetermined space.

12. A non-transitory computer-readable storage medium storing computer-executable program instructions, execution of which by a computer causes the computer to track an object, the program instructions comprise:
instructions to correct a first information of at least one first candidate target object, detected by an image sensor, according to a first predetermined motion model, and to determine a first distribution that is a distribution of the first information;
instructions to correct a second information of at least one second candidate target object, detected by an active type sensor by measuring a reflected wave, according to a second predetermined motion model, and to determine a second distribution that is a distribution of the second information;
instructions to obtain a plurality of distribution parameters from the first distribution and the second distribution based on a correlation therebetween; and
instructions to determine whether or not the second information corresponds to a false image based on the plurality of distribution parameters, wherein
each of the first information and the second information includes at least one of a relative speed and a distance, and
both the at least one first candidate target object and the at least one second candidate target object are obtained by detecting at least one target object existing in a predetermined space.

* * * * *